June 10, 1958 W. J. O'BRIEN ET AL 2,838,753
RADIO RANGE-INDICATING SYSTEMS
Filed Aug. 27, 1951
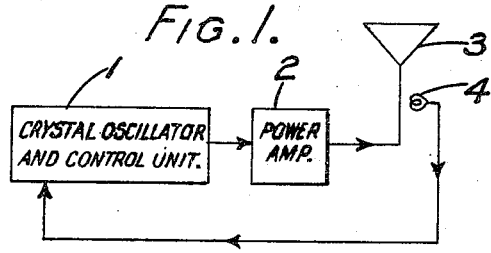
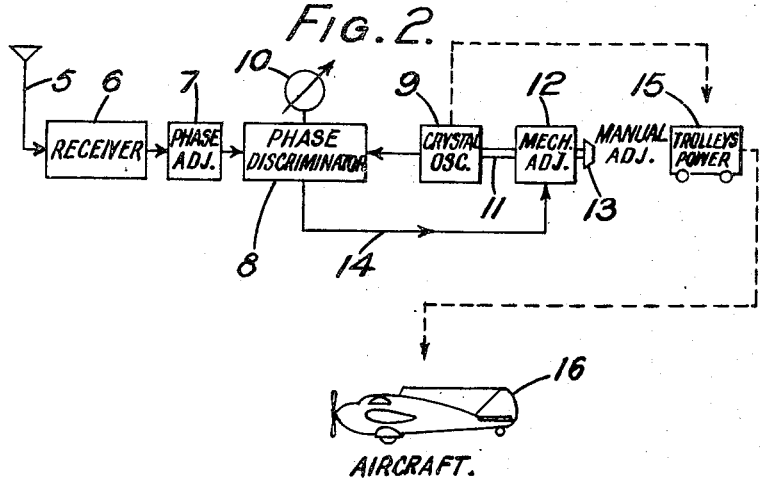
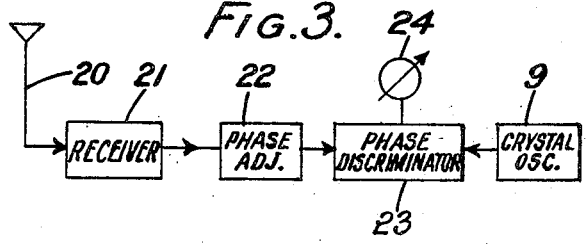
INVENTORS
W. J. O'BRIEN +
D. E. BRIDGES
By Wilkinson & Mawhinney
ATTYS.

United States Patent Office 2,838,753
Patented June 10, 1958

2,838,753

RADIO RANGE-INDICATING SYSTEMS

William Joseph O'Brien and Donald Edward Bridges, London, England, assignors to The Decca Record Company Limited, London, England, a British company Application August 27, 1951, Serial No. 243,852

Claims priority, application Great Britain September 7, 1950

10 Claims. (Cl. 343—105)

This invention relates to a radio range-indicating system for indicating the range of a vehicle, such as an aircraft, from a fixed transmitting station.

It is well known that frequency, wavelength, phase, time and distance are related quantities and that a measurement of one of these units may be derived from the measurement of a suitable combination of the other units. Thus if on a vehicle there is carried an oscillator to generate a signal which can be compared in phase with a signal received from a fixed transmitting station, then, provided both signals are stable in frequency, any change in distance between the oscillator and the transmitting station will produce a change in the phase relation. One cycle of phase difference will result from a change in distance of one wavelength being that corresponding to the effective frequency at which the phase comparison is made.

According to this invention, a radio range-indicating system for indicating the range of a vehicle, such as an aircraft, from a fixed transmitting station comprises means at the transmitting station for radiating a signal of highly stable frequency, an oscillator unit adapted to be carried by the vehicle, means for adjusting the frequency of the oscillator immediately before the commencement of a journey so as to synchronise the oscillator output with the signal radiated from said transmitting station and means on the vehicle for indicating the phase difference between the signal received from the transmitting station and the output from said oscillator unit.

In the present state of the art, the maximum long time stability of the portable crystal oscillator is approximately one part in $10^6$. The short time stability over a period of about two hours is, however, approximately one part in $10^9$. A higher order of stability can be obtained at a ground transmitting station than in a portable oscillator and the transmitting station may have a short time stability of one part in $10^{10}$. A constant frequency error of one part in $10^6$ will result in an accumulated distance error of 1080 kilometres per hour, this error being dependent only on the frequency error. An error of one part in $10^9$ on the other hand will result in an accumulated distance error of 1080 metres per hour. It will be understood therefor that the practical use of such a system is at present limited to short journeys and furthermore that it is necessary to maintain the portable oscillator in strict synchronism with the signal radiated from the transmitting station up to the time of the commencement of the journey. Small deviations between the oscillator frequency and the frequency of the radiated signal may be tolerated and such deviations may be indicated as a distance error per hour.

In order to synchronise the oscillator unit before the departure of the vehicle the oscillator unit is preferably detachable from the vehicle and there is provided, at the point of departure, means for adjusting the frequency of a detached oscillator unit comprising means for receiving the radiated signal, a phase discrimination unit for producing a control voltage in accordance with the difference in phase between the received signal and the oscillator output signal and means for applying the control voltage to frequency adjusting means on said oscillator so as to adjust the frequency in a direction to minimize changes in the control voltage.

There may be provided a phase indicator to indicate the phase difference determined by said phase discriminator and a manually operable control for effecting a coarse adjustment of said frequency adjusting means, the control in this arrangement being adjusted manually so that the rate of change of the phase indication is reduced to a minimum. Thus a coarse adjustment of the frequency may be rapidly effected before the final fine adjustment which is effected automatically by the control voltage from the phase discriminator.

According to a further aspect of the invention, radio range-indicating apparatus for use on a vehicle, such as an aircraft, to indicate the distance from a fixed transmitting station radiating signals of highly stable frequency comprises an adjustable frequency oscillator, a receiver for receiving the signal radiated from said transmitting station and means for indicating the phase difference between the signal received from the transmitting station and the output from said oscillator unit. As previously indicated, by adjusting the oscillator, before the departure of the vehicle, to be in synchronism with the received signals, the indicating means gives an indication of the range from the transmitting station.

Preferably there is provided a phase adjuster for adjusting the phase of the signal applied to the phase indicating means from said receiver. Thus the indicator can be initially set to give a pre-determined reading, corresponding to the range at the point of departure.

The invention also includes apparatus for synchronising the output signal from a portable oscillator with a radiated signal of stable frequency comprising means for receiving said radiated signal, a phase discriminator unit for producing a control voltage in accordance with the difference in phase between the received signal and the oscillator output and means for applying the control voltage to frequency adjusting means on said oscillator so as to adjust the frequency in a direction to minimise changes in the control voltage. Such apparatus can be installed at an air port and used for synchronising detachable oscillator units carried by the aircraft, means, such as a trolley having source of electric power supply, being provided for transporting an oscillator unit without loss of synchronism to an aircraft from the synchronising apparatus.

The following is a description of one embodiment of the invention reference being made to the accompanying drawings in which:

Figure 1 is a simplified block diagram of the equipment used at a fixed transmitting station, Figure 2 is a block diagram illustrating the equipment that is provided at an airport and Figure 3 is a block diagram illustrating the equipment used on an aircraft.

Referring to Figure 1, the combined crystal oscillator and automatic phase controller unit 1 feeds signals to a power amplifier 2 where the signals are amplified before being radiated from the antenna 3. A pick-up coil 4 is inductively coupled to the antenna 3 and provides a reference signal for the automatic phase controller so as to maintain a fixed phase relationship between the output of the crystal oscillator and the signal induced in the pick-up coil 4. Such a transmitting station may be constructed as described in British patent specification No. 656,124 filed October 8, 1948 and entitled "Improvements in or Relating to Phase Controlling Circuits" and reference may be made to that specification for further details of the construction of a suitable transmitting station. The crystal oscillator for the ground transmitting station is of high stability and has much greater frequency stability than is possible for the portable oscillator units to be carried in an aircraft or other vehicle. The pick-up unit 4 and automatic phase controller serve to maintain a constant phase relation between the output from the crystal oscillator and the radiated signal as is described in the aforementioned British patent specification No. 656,124. The radiated radio frequency signal can therefore be regarded as a reference signal of very high frequency stability.

Figure 2 illustrates diagrammatically the equipment provided at an airport to synchronise portable crystal oscillator units which are carried by the aircraft. The signals radiated from the transmitting station are picked up by an antenna 5 which is coupled to a receiver 6. The output from the receiver 6 is passed through a phase adjuster 7 to a phase discriminator 8 where the phase of the received signals is compared with that of the output from a crystal oscillator 9 which is to be synchronised with the received signals. The phase discriminator 8 produces an output signal corresponding to the phase relation of the two inputs and this output signal is applied to an indicator 10 which thus indicates the phase relation between the received signal and the oscillator output. For synchronising purposes, the oscillator 9 is made adjustable in frequency over a small range and a detachable shaft 11 is provided for mechanically coupling the frequency adjusting means of the oscillator, for example a variable condenser in the oscillator circuit, to a mechanical adjuster 12 having a manual control 13 by means of which the frequency can be manually adjusted. When an oscillator is to be synchronised, it is first coupled into the synchronising apparatus of Figure 2 by means of the shaft 11 and the phase adjuster 7 is set to give a predetermined reading on the indicator 10. If the oscillator is not in perfect synchronism with the signals received from the transmitting station, the phase indication will drift from the original setting. The rate of drift is reduced to a minimum by adjustment of the manual frequency control 13. In this way a coarse frequency adjustment is effected and the oscillator may be brought into close synchronism with the received signal in less than one minute.

The final fine adjustment requires considerably longer time and care and this final adjustment is effected electro-mechanically by applying a control voltage produced by the phase discriminator 8 through a coupling conductor 14 to the mechanical frequency adjuster 12. This mechanical frequency adjuster is arranged to alter the frequency of the oscillator in response to changes in the control voltage in such a manner that the phase of the oscillator output is changed in a direction to minimize changes in the control voltage produced by the phase discriminator which compares the phase of the oscillator output with the received signals from the transmitting station. For this purpose the aforementioned variable condenser in the oscillator circuit is provided with a drive motor to which is applied the output voltage from the phase discriminator. The phase adjuster 7 is initially set, by reference to the indicator 10, to give zero output voltage. If the frequency of the oscillator 9 is not correct, the phase of the oscillator output with respect to the received signal will drift so producing a gradually increasing output voltage from the discriminator. As is well known, the output voltage may be amplified by increasing the effective phase shift, for example by multiplying the frequencies of the signals being compared before applying them to the discriminator and it is readily possible to arrange that a very small frequency error rapidly builds up an appreciable output voltage. The drive motor is arranged to effect a very slow frequency change. The oscillator frequency is thus made to hunt about the desired value, to which it is gradually brought provided the amplification factor is high enough. It will be understood that with this arrangement the coarse adjustment made initially must be sufficiently accurate that the phase discriminator can control the frequency, that is to say, the phase difference between the signals must not drift outside the range over which the discriminator has a suitable output voltage characteristic.

Alternatively the fine control might be effected by arranging that when the phase discriminator output voltage reaches a pre-determined small value, the motor drives the frequency adjusting condenser to alter the frequency by a small step in the appropriate direction and simultaneously a phase adjuster in one of the input circuits of the discriminator is automatically altered to remove the phase difference which causes the control voltage. By this arrangement, the oscillator frequency is adjusted in steps to the required value without any hunting.

When the oscillator 9 has been synchronised and is ready to be put in an aircraft, a trolley 15 equipped with power supply batteries is brought close to the oscillator. The oscillator is put on the trolley and a rapid transfer of power supply connections to the batteries on the trolley is made. The H. T. supply to the oscillator unit is provided with sufficient condenser capacity connected internally to maintain the oscillator during the transfer of power. It will be understood that to maintain the required frequency stability the oscillator crystal will be housed in an oven which is electrically controlled to keep the crystal temperature constant and that the power supply connections for the oven will be rapidly transferred to the batteries on the trolley in same manner as the other power supply circuits. In this way the transfer of the oscillator unit to the trolley is made without seriously affecting the oven temperature of the amplitude of the oscillations of the crystal which if altered may affect the frequency.

The oscillator unit is then transported on the trolley to an aircraft 16 and the oscillator unit is taken from the trolley and installed in the aircraft with a similar rapid transfer of power supply. The equipment on the aircraft is illustrated in Figure 3 and is similar to that used at the airport for comparing the phase of the oscillator output with signals received from the transmitting station. It comprises an antenna 20, a receiver 21, a phase adjuster 22, a phase discriminator 23 and indicator 24 together with the detachable oscillator unit 9. The phase adjuster 22 is set so that the indicator 24 gives an indication corresponding to the initial range from the transmitting station and this indicator will then, during the journey, indicate the distance of the aircraft from the transmitting station.

Although the oscillator 9 is preferably arranged to generate an output signal of the same frequency as the signals radiated from the transmitting station it will be understood that this is not essential so long as the frequencies are such that the two signals can be compared in phase; for example the frequencies may be different multiples of a common fundamental frequency and frequency multipliers provided to bring the signals to a common comparison frequency. It will also be appreciated that frequency multiplication in the phase comparison system will increase the sensitivity of the system i. e. the rates of change of measured phase angle to change of distance and thus the sensitivity may be increased as desired whatever may be the actual frequencies employed as is well known in the technique of phase comparison navigation systems.

In the embodiment described above, the radio frequency radiated by the transmitting station is made a signal of highly stable frequency. Although that arrangement is preferred, a highly stable frequency signal could be radiated as a modulation signal superimposed on a radio frequency carrier; a very high frequency carrier may then be employed.

We claim:

1. A radio range-indicating system for indicating the range of a vehicle from a fixed transmitting station comprising radio transmitting apparatus at the transmitting station for radiating a radio signal of highly stable frequency; an oscillator unit having frequency adjusting means for adjusting the frequency of the output signal and adapted to be carried by the vehicle but detached therefrom for synchronising before the commencement of a journey; a receiver on the vehicle for receiving the signal radiated by the transmitting station; a phase angle indicator on the vehicle for indicating the phase difference between the signal received from the transmitting station and the output from said oscillator unit; and means for setting the frequency of the oscillator unit when detached from the vehicle before the commencement of a journey which means comprises means for receiving the radiated signal, a phase discriminator for producing a control voltage in accordance with the difference in phase between the received signal and the oscillator output signal and means for applying the control voltage to said frequency adjusting means on the oscillator so as to bring the oscillator frequency into synchronism with the frequency of the received signal.

2. A radio range-indicating system according to claim 1 wherein there is provided a phase difference indicator to indicate the phase difference determined by said phase discriminator and wherein a manually operable control is provided for effecting a coarse adjustment of said frequency adjusting means.

3. A radio range-indicating system for indicating the range of a vehicle from a fixed transmitting station comprising radio transmitting apparatus at the transmitting station for radiating a radio signal of highly stable frequency; an oscillator unit having frequency adjusting means for adjusting the frequency of the output signal and adapted to be carried by the vehicle but detachable therefrom for synchronising before the commencement of a journey; a receiver on the vehicle for receiving the signal radiated by the transmitting station; and means for setting the frequency of the oscillator unit when detached from the vehicle before the commencement of a journey which means comprises means for receiving the radiated signal, a phase discriminator having two input circuits and arranged to produce a control voltage in accordance with the difference in phase between signals applied to the two input circuits, a first circuit means for applying the oscillator output signal to one of said input circuits, a second circuit means for applying the received signal from the transmitting station to the other of said input circuits, a phase adjuster connected in one of said circuit means for adjusting the phase of one of the signals applied to said discriminator, and means coupling said discriminator to said oscillator for applying said control voltage to said frequency adjusting means so as to bring the frequency of the oscillator output into synchronism with the frequency of the radiated signal.

4. A radio range-indicating system for indicating the range of a vehicle from a fixed transmitting station comprising means at the transmitting station for radiating a radio signal of highly stable frequency, an adjustable frequency oscillator adapted to be carried by the vehicle but detachable therefrom, means at the point of departure of the vehicle for synchronising the frequency of the oscillator with the signal radiated from said transmitting station when detached from the vehicle immediately before the commencement of a journey, means for transporting and installing the synchronized oscillator in the vehicle without loss of synchronization, a receiver on the vehicle for receiving the signal radiated from the transmitting station, a phase discriminator and phase angle indicator on the vehicle arranged to indicate the phase relation between signals applied to two input circuits, a first circuit means for applying the oscillator output signal to one of said input circuits, a second circuit means for applying the received signal from the transmitting station to the other of said input circuits, and a phase adjuster connected in one of said circuit means for adjusting the phase of one of the signals applied to said phase discriminator and phase angle indicator.

5. A radio range-indicating system for indicating the range of a vehicle from a fixed transmitting station comprising means at the transmitting station for radiating a single unmodulated radio signal of a given and highly stable frequency, an adjustable frequency oscillator adapted to be carried by the vehicle but detachable therefrom, means for adjusting the oscillator to said given frequency when detached from the vehicle immediately before the commencement of a journey, means for transporting and installing the synchronized oscillator in the vehicle without loss of synchronization, a receiver on the vehicle for receiving the signal radiated from the transmitting station and phase discriminating and indicating apparatus on the vehicle arranged to measure and indicate the phase relation between the output of said oscillator and the signal received by said receiver.

6. A radio-range-indicating system for indicating the range of a vehicle from a fixed transmitting station comprising means at the transmitting station for radiating a single unmodulated radio signal of a given highly stable frequency, an adjustable frequency oscillator adapted to be carried by the vehicle but detachable therefrom, means at the point of departure of the vehicle for receiving the radiated signal of said given frequency, comparison means at said point of departure for comparing the frequency of the received signal with the frequency of said oscillator, means controlled by said comparison means for adjusting the frequency of said oscillator to said given frequency whilst the oscillator is detached from the vehicle, means for transporting and installing the oscillator in the vehicle without loss of synchronization, a receiver on the vehicle for receiving the signal radiated from the transmitting station, and phase discriminating and indicating apparatus on the vehicle arranged to measure and indicate the phase relation between the output of said oscillator and the signal received by said receiver.

7. A radio range-indicating system for indicating the range of a vehicle from a fixed transmitting station comprising means at the transmitting station for radiating a radio signal of highly stable frequency, an adjustable frequency oscillator unit adapted to be carried on the vehicle but detachable therefrom, means at the point of departure of the vehicle for synchronising with the radiated signals the oscillator unit when detached from the vehicle, means for transporting and installing the synchronised oscillator in the vehicle without loss of synchronisation, a receiver on the vehicle for receiving the signals radiated from the transmitting station, and phase discriminating and indicating apparatus on the vehicle arranged to measure and indicate the phase relation between the output of said oscillator unit and the signal received by said receiver.

8. A radio range-indicating system for indicating the range of a vehicle from a fixed transmitting station comprising means at the transmitting station for radiating a radio signal of highly stable frequency; an oscillator unit having means for adjusting the output frequency and adapted to be carried on the vehicle but detachable therefrom; means at the point of departure of the vehicle for synchronising with the radiated signals the oscillator unit when detached from the aircraft, which synchronising means comprises a receiver for receiving the radiated signal, a phase discriminator arranged to produce an output signal dependent on the difference of phase between the received signal and the oscillator output and means for applying said output signal to said frequency adjusting means so as to adjust the frequency of the oscillator into synchronism with the frequency of the received signal; means for maintaining the oscillator oscillating at the adjusted frequency whilst being transported to and installed in the vehicle; a receiver on the vehicle for receiving the signals radiated from the transmitting station; and phase discriminating and indicating apparatus on the vehicle arranged to measure and indicate the phase relation between the output of said oscillator and the signal received by the receiver on the vehicle.

9. A radio range-indicating system for indicating the range of a vehicle from a first fixed position comprising a radio transmitter at said first position for radiating a signal of highly stable frequency, a portable oscillator unit having frequency adjusting means for adjusting the frequency of its output signal, a receiver at a second fixed position for receiving the radiated signal, a phase discriminator at said second position for comparing the phase of the received signal with the phase of the output signal of the oscillator unit, means for controlling said frequency adjusting means in accordance with the phase comparison to minimize the rate of phase change between the received signal and the oscillator output, means for maintaining the oscillator oscillating at the adjusted frequency while being transported to and installed in the vehicle, a receiver on the vehicle for receiving the radiated signal and phase angle indicating apparatus on the vehicle for measuring and indicating the phase relation between the output of the oscillator and the signal received by the receiver on the vehicle.

10. A radio range-indicating system for indicating the range of a vehicle from a transmitting station comprising means at the transmitting station for radiating a radio signal of highly stable frequency; an oscillator unit having means for adjusting the output frequency and adapted to be carried on the vehicle; a receiver on the vehicle for receiving the signals radiated from the transmitting station; a phase discriminator and indicator on the vehicle arranged to measure and indicate the phase relation between the output of said oscillator unit and the signal received by said receiver; and auxiliary synchronising apparatus for synchronising the output signal from said oscillator unit with the radiated signal before the commencement of a journey by said vehicle, which synchronizing apparatus comprises a receiver for receiving said radiated signal, a phase discriminator unit for producing a control voltage in accordance with the difference in phase between the received signal and the oscillator output, a member adapted to move in accordance with said control voltage and mechanical coupling means detachable from the oscillator for coupling said member to the frequency adjusting means on the oscillator so as to adjust the frequency in a direction to minimize changes in the control voltage.

References Cited in the file of this patent

UNITED STATES PATENTS

| | | |
|---|---|---|
| 1,495,616 | Simpson | May 27, 1924 |
| 1,562,485 | Affel | Nov. 24, 1925 |
| 1,750,668 | Green | Mar. 18, 1930 |
| 2,085,424 | Goddard | June 29, 1937 |
| 2,218,907 | Donnelly et al. | Oct. 22, 1940 |
| 2,517,805 | Spindler | Aug. 8, 1950 |